June 14, 1938.　　　　　J. COTAL　　　　2,120,733
CLUTCHING AND SPEED CHANGING MECHANISM
Filed Sept. 4, 1936
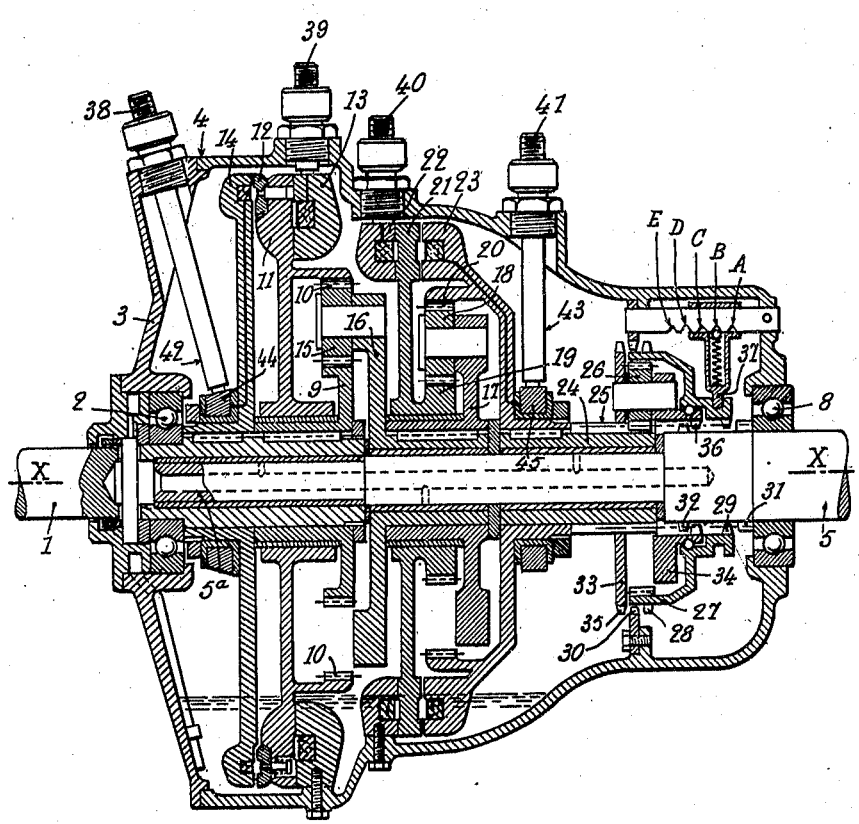

Patented June 14, 1938

2,120,733

UNITED STATES PATENT OFFICE 2,120,733

CLUTCHING AND SPEED CHANGING MECHANISM

Jean Cotal, Paris, France

Application September 4, 1936, Serial No. 99,478
In France May 26, 1936

6 Claims. (Cl. 74—270)

The present invention has for its object a clutching and speed changing mechanism of the type consisting of planetary gear sets under electric control.

The said mechanism is chiefly characterized by the fact that it comprises two planetary gear sets with straight teeth, which are mounted in series and whose planetary pinion carriers, which are independent of the driving and the driven shaft, are connected together, as to rotation, by their central part.

Preferably, the gear ratios and the construction of the planetary sets are such that the secondary shaft, according to the connections made under electric control, may be driven by the driving shaft either with speed reduction, or on direct drive, or at increased speed.

According to another characteristic, the dimensions of the second set are reduced with reference to those of the first set, in such way that the parts connected with the secondary shaft, which is adapted for a high speed of rotation, will have reduced masses.

Preferably, there is mounted between the aforesaid secondary shaft and the shaft to be driven, a planetary mechanism, or the like, provided with teeth, claws or other projections affording either a direct connection or a connection with speed-reduction, in the same direction or in contrary directions.

In this case, there is preferably provided a means for braking or for stopping, under electromechanical control which permits of eliminating any driving torque produced by the driving shaft, in order to facilitate the engagement of the teeth, claws or like projections of the aforesaid device.

Further characteristics will be disclosed in the following description.

The accompanying drawing, which is given solely by way of example, shows a longitudinal section of a mechanism in accordance with the invention.

In this embodiment, 1 is the driving shaft whose axis is X—X, and it is mounted in the ball bearing 2 which is located in the cover 3 of the stationary casing 4. The driven shaft 5, which projects from the said casing through a second ball bearing 8, extends to the point 5ª within the shaft 1, in which it is centered on the axis X—X.

To the driving shaft 1 is keyed a sun-wheel 9 with external teeth, pertaining to a first planetary gear set whose orbit-wheel 10 with internal teeth is loose about the shaft 1 (it being mounted for instance on an extension of the hub of the sun-wheel 9). The orbit-wheel 10 may be secured to the shaft 1 or to the casing 4. For this purpose, it is extended at the periphery by an armature 11 to which is secured an auxiliary armature 12. Opposite the armature 11 is located an electromagnet 13 which is secured to the casing 4. Opposite the auxiliary armature 12 is mounted another electromagnet 14 which is keyed to the driving or primary shaft 1. It will thus be observed that according as the electromagnet 13 or 14 is energized, the orbit-wheel 10 will be held fast with reference to the casing 4 or will be connected, as to rotation, with the shaft 1. When the electromagnets 13 and 14 are not energized, the orbit-wheel 10 is loose.

The sun-wheel 9 and orbit-wheel 10 are in gear engagement with planetary pinions 15, mounted on planetary pinion carrier 16 which is loose on the shaft 1. To the hub of the said carrier 16 is keyed the hub of the planetary pinion carrier 17 of a second planetary gear set. The planetary pinions 18 of this second set are in gear with a sun-wheel 19 having external teeth, and also with an orbit-wheel 20 having internal teeth.

The sun-wheel 19 with external teeth is loose about the axis X—X, and is for instance loose on the hub of the planetary pinion carrier 17. It is extended at the periphery by a ring 21 which forms an armature located between two electromagnets 22 and 23. The electromagnet 22 is secured to the casing 4, and it thus permits of holding the sun-wheel 19 in the fixed position. The other electromagnet 23 is mounted on the orbit-wheel 20 with internal teeth, and it thus permits of connecting together, as to rotation, the sun-wheel 19 and orbit-wheel 20 of the second set.

Preferably, the radial dimensions of the second set are less than those of the first set, and hence the masses, and chiefly of the electromagnet 23 and the armature 21 adapted for a rapid rotation, will have relatively a reduced value. This is obtained principally by the method used for connecting the planetary pinion carriers 16 and 17 together at their centers and by the respective values of the gear ratios in each set. This arrangement permits, in fact, of locating the web or the arms of the armature 21, secured to the sun-wheel 19, between these two planetary pinion carriers.

The orbit-wheel 20 with internal teeth might be secured, as to rotation, to the driven shaft 5.

However, in the embodiment herein represented, between the orbit-wheel 20 and the shaft 55 said carriers and a first internally toothed wheel connected with the other of said shafts and meshing with the pinion of the other carrier, a second internally toothed wheel meshing with the pinion on said one of said carriers and a second externally toothed sun-wheel mounted rotatably and loose on said sleeve and meshing with the pinion on said other of said carriers, means adapted to selectively brake said second internally toothed wheel and connect the same with said one of said shafts, and means adapted to selectively brake said second externally toothed sun-wheel and connect the same with said other of said shafts.

3. In a speed changing mechanism, a driving shaft, a driven shaft, two pinion carriers mounted rotatably and loose on one of said shafts and connected together at their central part, on each of said pinion carriers at least one pinion rotatably mounted on said carrier, a first externally toothed sun-wheel connected with said driving shaft and meshing with the pinion of one of said carriers and a first internally toothed wheel connected with said driven shaft and meshing with the pinion of the other carrier, a second internally toothed wheel meshing with the pinion on said one of said carriers and a second externally toothed sun-wheel meshing with the pinion on said other of said carriers, means adapted to selectively brake said second internally toothed wheel and connect the same with said driving shaft, and means adapted to selectively brake said second externally toothed sun-wheel and connect the same with said driven shaft.

4. In a speed changing mechanism according to claim 3, the further feature consisting in that the size of the planetary set comprising the second externally toothed sun wheel, the first internally toothed wheel and the pinion meshing with the same is smaller than that of the planetary set comprising the first externally toothed sun-wheel, the second internally toothed wheel and the pinion meshing with said two latter wheels.

5. In a speed changing mechanism according to claim 1, the further feature consisting in that the selective means for said second internally toothed wheel comprises two electromagnets, one of which is stationary and the other is connected with the shaft corresponding to said selective means, and two armatures rotatable with said first externally toothed sun-wheel, slidingly mounted on each other in an axial direction and adapted to be brought respectively into contact with said two electromagnets, and spring means adapted to urge said armatures towards each other and out of contact with said electromagnets.

6. In a speed changing mechanism according to claim 3, the further feature consisting in that the speed reducing gear ratio of the planetary set comprising the first externally toothed sun-wheel, the second internally toothed wheel and the pinion meshing with the same, when said second internally toothed wheel is held stationary, is greater than the speed increasing gear ratio of the planetary set comprising the second externally toothed sun-wheel, the first internally toothed wheel and the pinion meshing with the same, when said second externally toothed wheel is held stationary.

JEAN COTAL.